United States Patent
Htay

(10) Patent No.: US 10,169,028 B2
(45) Date of Patent: Jan. 1, 2019

(54) SYSTEMS AND METHODS FOR ON DEMAND APPLICATIONS AND WORKFLOW MANAGEMENT IN DISTRIBUTED NETWORK FUNCTIONS VIRTUALIZATION

(71) Applicant: Ciena Corporation, Hanover, MD (US)

(72) Inventor: Aung Htay, Alpharetta, GA (US)

(73) Assignee: Ciena Corporation, Hanover, MD (US)

(*) Notice: Subject to any disclaimer, the term of this patent is extended or adjusted under 35 U.S.C. 154(b) by 80 days.

(21) Appl. No.: 15/376,805

(22) Filed: Dec. 13, 2016

(65) Prior Publication Data

US 2018/0165110 A1    Jun. 14, 2018

(51) Int. Cl.
*G06F 9/455*    (2018.01)
*G06F 8/65*    (2018.01)

(52) U.S. Cl.
CPC ...................... *G06F 8/65* (2013.01)

(58) Field of Classification Search
CPC .................................................. G06F 9/45533
USPC ................................................................ 718/1
See application file for complete search history.

(56) References Cited

U.S. PATENT DOCUMENTS

| | | | |
|---|---|---|---|
| 8,811,968 B2* | 8/2014 | Aiglstorfer | G06F 9/45504 455/418 |
| 9,692,712 B2* | 6/2017 | Robitaille | H04L 47/825 |
| 9,912,558 B2* | 3/2018 | Chou | H04L 43/08 |
| 2009/0131035 A1* | 5/2009 | Aiglstorfer | G06F 9/45504 455/419 |
| 2014/0177450 A1 | 6/2014 | Chou et al. | |
| 2014/0229945 A1* | 8/2014 | Barkai | H04L 49/70 718/1 |
| 2014/0317293 A1* | 10/2014 | Shatzkamer | G06F 9/455 709/226 |
| 2015/0082308 A1* | 3/2015 | Kiess | G06F 9/5072 718/1 |
| 2015/0127805 A1* | 5/2015 | Htay | H04L 43/0876 709/224 |
| 2015/0271043 A1* | 9/2015 | Htay | H04L 43/0876 709/224 |
| 2015/0326448 A1* | 11/2015 | Chaudhary | G06Q 20/14 705/40 |

(Continued)

OTHER PUBLICATIONS

Ersue, "ETSI NFV Management and Orchestration—An Overview," ETSI NFV MANO WG Co-chair, IETF #88, Vancouver, Canada, Nov. 3-8, 2013.

(Continued)

*Primary Examiner* — Mehran Kamran
(74) *Attorney, Agent, or Firm* — Clements Bernard Walker PLLC; Christopher L. Bernard; Lawrence A. Baratta, Jr.

(57) ABSTRACT

A workloads management method for on-demand applications in distributed Network Functions Virtualization Infrastructure (dNFVI) includes receiving usage data from a unikernel implementing one or more functions of a plurality of functions related to a Virtual Network Function (VNF); determining an update to the one or more functions in the unikernel based on the usage data; updating the unikernel by requesting generation of application code for the unikernel based on the update; and starting the updated unikernel and redirecting service requests thereto. The unikernel and the updated unikernel are executed directly on a hypervisor

17 Claims, 23 Drawing Sheets

(56) References Cited

U.S. PATENT DOCUMENTS

| | | | |
|---|---|---|---|
| 2016/0043944 A1* | 2/2016 | Felstaine | H04L 45/70 370/389 |
| 2016/0050159 A1* | 2/2016 | Cook | G06F 9/00 709/226 |
| 2016/0057234 A1* | 2/2016 | Parikh | H04L 67/16 709/226 |
| 2016/0139939 A1* | 5/2016 | Bosch | H04L 67/10 718/1 |
| 2016/0196449 A1* | 7/2016 | Sikka | G06F 21/6218 726/30 |
| 2016/0205004 A1* | 7/2016 | Chou | H04L 43/08 709/224 |
| 2016/0300227 A1 | 10/2016 | Subhedar et al. | |
| 2016/0364226 A1* | 12/2016 | Takano | G06F 8/65 |
| 2016/0378989 A1* | 12/2016 | Park | G06F 21/566 726/23 |
| 2016/0381150 A1* | 12/2016 | Rajagopal | G06F 9/45558 709/223 |
| 2017/0155724 A1* | 6/2017 | Haddad | H04L 67/16 |
| 2017/0170990 A1* | 6/2017 | Gaddehosur | H04L 12/4675 |
| 2017/0237647 A1* | 8/2017 | N. | H04L 43/16 709/224 |
| 2017/0237819 A1* | 8/2017 | Qiu | H04L 67/16 709/223 |
| 2017/0272523 A1* | 9/2017 | Cillis | H04L 41/082 |
| 2017/0364377 A1* | 12/2017 | Koller Jemio | G06F 8/54 |
| 2018/0026858 A1* | 1/2018 | Zhang | H04L 41/5054 |
| 2018/0026911 A1* | 1/2018 | Anholt | H04L 47/805 |
| 2018/0034801 A1* | 2/2018 | Nakano | H04L 63/083 |
| 2018/0046446 A1* | 2/2018 | Turovsky | G06F 8/65 |
| 2018/0048523 A1* | 2/2018 | Nakano | H04L 41/0873 |
| 2018/0069793 A1* | 3/2018 | Narayanan | H04L 47/10 |
| 2018/0084084 A1* | 3/2018 | Sharma | H04L 67/34 |
| 2018/0091449 A1* | 3/2018 | Tellez | H04L 51/04 |

OTHER PUBLICATIONS

Yang et al. "Enabling Deployment of Software Defined Networks and Network Function Virtualization in 2015", DATS003, IDF15, 2015.

\* cited by examiner

```
{
    "devOps": {
        "repo": "git://github.com/blueplanet/sd-wan.git",
        "releaseTag": "02312b5c72261f61a93b4dba4a9acdc09814fbd7"
    },
    "unikernels": [
        {
            "features": "A, C",
            "composer": "bin/featureExtract",
            "buildCommands": "mirage configure -t xen && make",
            "config": {
                "ip": "10.92.19.72",
                "port": 8080
            }
        },
        {
            "features": "B",
            "composer": "bin/featureExtract",
            "buildCommands": "mirage configure -t xen && make",
            "config": {
                "ip": "10.92.19.72",
                "port": 8081
            }
        }
    ]
}
```

```
"devOps": {
    "repos": "ssh://git@bitbucket.ciena.com/bp_ra/bp-ra-ciena6500.git",
    "releaseTag" : "1.3.17",
},
"features" : [
    {
        "function": "discovery",
        "path": "access/discovery/discovery.py",
        "coverage": "env/bin/nosetests --with-coverage --cover-erase --cover-package=discovery"
    },
    {
        "function": "provision",
        "path": "access/provision/provision.py",
        "coverage": "env/bin/nosetests --with-coverage --cover-erase --cover-package=provision"
    },
    {
        "function": "perfmgmt",
        "path": "access/perfmgmt/perfmgmt.py",
        "coverage": "env/bin/nosetests --with-coverage --cover-erase --cover-package=perfmgmt"
    },
],
"checkout": [
    "git clone ssh://git@bitbucket.ciena.com/bp_ra/bp-ra-ciena6500.git",
    "git checkout 1.3.17",
],
"composer": "bin/featureExtract",
"build": [
    "make clean",
    "make prepare-venv",
    "make requirements",
    "make image"
],
```

FIG. 11

```
* Hostname was NOT found in DNS cache
*   Trying 10.92.19.208...
* Connected to 10.92.19.208 (10.92.19.208) port 443 (#0)
* successfully set certificate verify locations:
*   CAfile: none
    CApath: /etc/ssl/certs
* SSLv3, TLS handshake, Client hello (1):
* SSLv3, TLS handshake, Server hello (2):
* SSLv3, TLS handshake, CERT (11):
* SSLv3, TLS handshake, Server key exchange (12):
* SSLv3, TLS handshake, Server finished (14):
* SSLv3, TLS handshake, Client key exchange (16):
* SSLv3, TLS change cipher, Client hello (1):
* SSLv3, TLS handshake, Finished (20):
* SSLv3, TLS change cipher, Client hello (1):
* SSLv3, TLS handshake, Finished (20):
* SSL connection using ECDHE-RSA-AES256-GCM-SHA384
* Server certificate:
*   subject: C=US; ST=CA; L=Petaluma; O=Cyan Inc; OU=Blue Planet; CN=localhost; emailAddress=blueplanet@cyaninc.com
*   start date: 2015-07-27 23:06:08 GMT
*   expire date: 2036-07-22 23:06:08 GMT
*   issuer: C=US; ST=CA; L=Petaluma; O=Cyan Inc; OU=Blue Planet; CN=localhost; emailAddress=blueplanet@cyaninc.com
*   SSL certificate verify result: self signed certificate (18), continuing anyway.
> POST /ukagent/api/v1/generate HTTP/1.1
> User-Agent: Python-urllib/3.1
> Host: 10.92.19.208
> Content-Type: application/json
> Accept: */*
>
< HTTP/1.1 202 Accepted
< Date: Fri, 11 Nov 2016 21:31:25 GMT
< Content-Length: 0
< Etag: "a78564b3b521b49aee46bad28676ea89b0892145c784"
* Server cyclone/1.1 is not blacklisted
< Server: cyclone/1.1
<
```

FIG. 12

```
"devOps": {
    "repo": "ssh://git@bitbucket.ciena.com/bp_ra/bp_ra-ciena6500.git",
    "releaseTag": "1.3.17"
},
"unikernels": {
    {
        "features": [ "discovery" ],
        "composer": "bin/featureExtract",
        "buildCommands": [
            "make clean",
            "make prepare-venv",
            "make requirements",
            "make image"
        ]
    },
    {
        "features": [ "provision", "perfmgmt" ],
        "composer": "bin/featureExtract",
        "buildCommands": [
            "make clean",
            "make prepare-venv",
            "make requirements",
            "make image"
        ]
    }
}
```

```
vagrant@vagrant-ubuntu-trusty-64:~/shared/bp-ra-ciena6500$ make clean
rm -rf *.deb
rm -rf build
rm -rf dist
rm -rf *.egg
rm -rf *.pyc
rm -rf env
rm -rf target
make -C itests clean
make[1]: Entering directory `/home/vagrant/shared/bp-ra-ciena6500/itests'
rm -rf env
make[1]: Leaving directory `/home/vagrant/shared/bp-ra-ciena6500/itests'
vagrant@vagrant-ubuntu-trusty-64:~/shared/bp-ra-ciena6500$
vagrant@vagrant-ubuntu-trusty-64:~/shared/bp-ra-ciena6500$ make prepare-venv
New python executable in /home/vagrant/shared/bp-ra-ciena6500/env/bin/python2.7
Also creating executable in /home/vagrant/shared/bp-ra-ciena6500/env/bin/python
Installing setuptools, pip, wheel...done.
Collecting pip==7.1.2
  Using cached pip-7.1.2-py2.py3-none-any.whl
Installing collected packages: pip
  Found existing installation: pip 9.0.1
    Uninstalling pip-9.0.1:
      Successfully uninstalled pip-9.0.1
Successfully installed pip-7.1.2
You are using pip version 7.1.2, however version 9.0.1 is available.
You should consider upgrading via the 'pip install --upgrade pip' command.
Collecting afkak==2.2.0 (from -r requirements.txt (line 1))
...
...
...
Installing collected packages: raciena6500
  Running setup.py develop for raciena6500
Successfully installed raciena6500
```

```
{
    "timings" : [
        {
            "feature": "discovery",
            "unit": "millisecond",
            "maximum": 1442,
            "minimum": 988,
            "inactive": [
                {
                    "start": "2016-10-10T13:45:00Z",
                    "end": "2016-10-10T13:47:38Z"
                },
                {
                    "start": "2016-10-10T13:48:05Z",
                    "end": "2016-10-10T14:00:00Z"
                }
            ]
        },
        {
            "feature": "provision",
            "unit": "millisecond",
            "maximum": 0,
            "minimum": 0,
            "inactive": [
                {
                    "start": "2016-10-10T13:45:00Z",
                    "end": "2016-10-10T14:00:00Z"
                }
            ]
        },
        {
            "feature": "perfmgmt",
            "unit": "millisecond",
            "maximum": 0,
            "minimum": 0,
            "inactive": [
                {
                    "start": "2016-10-10T13:45:00Z",
                    "end": "2016-10-10T14:00:00Z"
                }
            ]
        }
    ]
}
```

FIG. 19

SYSTEMS AND METHODS FOR ON DEMAND APPLICATIONS AND WORKFLOW MANAGEMENT IN DISTRIBUTED NETWORK FUNCTIONS VIRTUALIZATION

FIELD OF THE DISCLOSURE

The present disclosure generally relates to networking systems and methods. More particularly, the present disclosure relates to systems and methods for distributed and on-demand applications and workflow management in Distributed Network Functions Virtualization (DNFV).

BACKGROUND OF THE DISCLOSURE

Network Functions Virtualization (NFV) is a network architecture concept that uses the technologies of virtualization to virtualize entire classes of network node functions into building blocks that may connect, or chain together, to create communication services. A Virtualized Network Function (VNF) may include one or more virtual machines running different software and processes, on top of standard high-volume servers, switches and storage devices, or even cloud computing infrastructure, instead of having custom hardware appliances for each network function. For example, a virtual session border controller could be deployed to protect a network without the typical cost and complexity of obtaining and installing physical network protection units. Other examples of NFV include virtualized load balancers, firewalls, intrusion detection devices and Wide Area Network (WAN) accelerators. Ideally, virtualized functions should be located where they are the most effective and least expensive. That means a service provider should be free to locate NFV in all possible locations, from the data center to the network node to the customer premises. This approach, known as distributed NFV, has been emphasized from the beginning as NFV was being developed and standardized. For some cases, there are clear advantages for a service provider to locate this virtualized functionality at the customer premises. These advantages range from economics to performance to the feasibility of the functions being virtualized.

In conventional approaches, VNFs are realized with Virtual Machines (VMs). VMs include operating-system virtualization, which boot a standard operating system kernel (such as Linux, Windows, etc.) and run unmodified applications. These VMs are managed by orchestration systems like OpenStack, VMWare, etc. Other approaches to VNF realization can include software containers. Software containers contain an entire runtime environment, namely an application, plus all its dependencies, libraries and other binaries, and configuration files needed to run it, bundled into one package. By containerizing the application platform and its dependencies, differences in operating systems distributions and underlying infrastructure are abstracted away. VMs, by contrast, include the same application along with an entire operating system. Thus, a physical server running three virtual machines would have a hypervisor and three separate operating systems running on top of it. On the contrary, software containers would use the same operating system on the physical server. Disadvantageously, in DNFV, VM and software containers are heavy since each contains a whole operating system. Existing cloud orchestration systems such as OpenStack have a high latency when manipulating small VMs. For example, OpenStack will not be able to manage the case of 2000-3000 VMs per host.

In contrast to VMs and software containers, unikernels are specialized, single address space machine images constructed by using library operating systems. For example, a developer selects, from a modular stack, the minimal set of libraries which correspond to the operating system constructs required for their application to run. These libraries are then compiled with the application and configuration code to build sealed, fixed-purpose images (unikernels) which run directly on a hypervisor or hardware without an intervening operating system such as Linux or Windows. That is, unikernels are applications written in a high-level language and compiled into the standalone kernel. These applications are managed simply by wrapping them as block devices and registering them to the cloud provider (for example Amazon Machine Image AMI for Amazon EC2).

Existing unikernel systems concentrate their efforts on the optimization and generation of the standalone kernel. The downside is that adjusting functionality by altering a compiled unikernel is generally not attempted due to the lack of a low latency distributed solution. There are no known distributed management systems whereby a workload/application can request to be regenerated and re-deployed as single purpose application. There is no known DevOps style participation by the unikernels at the edge of the distributed infrastructure. However, unikernels are much lighter compared to VMs and software containers and would be advantageous to use for VNF realization in distributed NFV implementations.

BRIEF SUMMARY OF THE DISCLOSURE

In an exemplary embodiment, a workloads management method for on-demand applications in distributed Network Functions Virtualization Infrastructure (dNFVI) includes receiving usage data from a unikernel implementing one or more functions of a plurality of functions related to a Virtual Network Function (VNF); determining an update to the one or more functions in the unikernel based on the usage data; updating the unikernel by requesting generation of application code for the unikernel based on the update; and starting the updated unikernel and redirecting service requests thereto. The workloads management method can further include receiving a service request for a function not included in the updated unikernel; and implementing a second unikernel for the function not included in the updated unikernel. The workloads management method can further include stopping the unikernel subsequent to the starting of the updated unikernel. The unikernel and the updated unikernel can be executed directly on a hypervisor. The usage data can include DevOps metadata, configurations, and usage metrics, and wherein the update can be determined based on the usage metrics of the one or more functions. The requesting generation of the application code can be to a unikernel generation agent which pulls the application code for one or more of the plurality of functions based on the update and performs compilations to generate the updated unikernel. The workloads management method can be performed by a workloads manager implemented on the unikernel, and wherein other unikernels are managed using an Application Programming Interface (API) to the workloads manager.

In another exemplary embodiment, a workloads manager for on-demand applications in distributed Network Functions Virtualization Infrastructure (dNFVI) includes one or more processors; and memory storing instructions that, when executed, cause the one or more processors to receive usage data from a unikernel implementing one or more functions of a plurality of functions related to a Virtual Network Function (VNF), determine an update to the one or more functions in the unikernel based on the usage data, update the unikernel by requesting generation of application code for the unikernel based on the update, and start the updated unikernel and redirect service requests thereto. The memory storing instructions that, when executed, can further cause the one or more processors to receive a service request for a function not included in the updated unikernel, and implement a second unikernel for the function not included in the updated unikernel. The memory storing instructions that, when executed, can further cause the one or more processors to stop the unikernel subsequent to the updated unikernel starting. The unikernel and the updated unikernel can be executed directly on a hypervisor. The usage data can include DevOps metadata, configurations, and usage metrics, and wherein the update can be determined based on the usage metrics of the one or more functions. The requesting generation of the application code can be to a unikernel generation agent which pulls the application code for one or more of the plurality of functions based on the update and performs compilations to generate the updated unikernel. Other unikernels can be managed using an Application Programming Interface (API) to the workloads manager.

In a further exemplary embodiment, a non-transitory computer-readable medium including instructions that, when executed, cause one or more processors to perform the steps of receiving usage data from a unikernel implementing one or more functions of a plurality of functions related to a Virtual Network Function (VNF); determining an update to the one or more functions in the unikernel based on the usage data; updating the unikernel by requesting generation of application code for the unikernel based on the update; and starting the updated unikernel and redirecting service requests thereto. The instructions that, when executed, can further cause the one or more processors to perform the steps of receiving a service request for a function not included in the updated unikernel; and implementing a second unikernel for the function not included in the updated unikernel. The instructions that, when executed, can further cause the one or more processors to stopping the unikernel subsequent to the starting of the updated unikernel. The unikernel and the updated unikernel can be executed directly on a hypervisor. The usage data can include DevOps metadata, configurations, and usage metrics, and wherein the update can be determined based on the usage metrics of the one or more functions. The requesting generation of the application code can be to a unikernel generation agent which pulls the application code for one or more of the plurality of functions based on the update and performs compilations to generate the updated unikernel.

BRIEF DESCRIPTION OF THE DRAWINGS

The present disclosure is illustrated and described herein with reference to the various drawings, in which like reference numbers are used to denote like system components/method steps, as appropriate, and in which:

FIG. 7 is code for exemplary metadata for unikernel generation;

FIG. 9 is code for an exemplary Resource Adapter (RA) implemented with a modular structure;

FIG. 11 is metadata for the RA in JavaScript Object Notation (JSON);

FIG. 12 is a POST request from the workloads manager to the unikernel generation agent;

FIG. 13 is a specific example in JSON for a request to generate two unikernels;

Figures 14, 15:
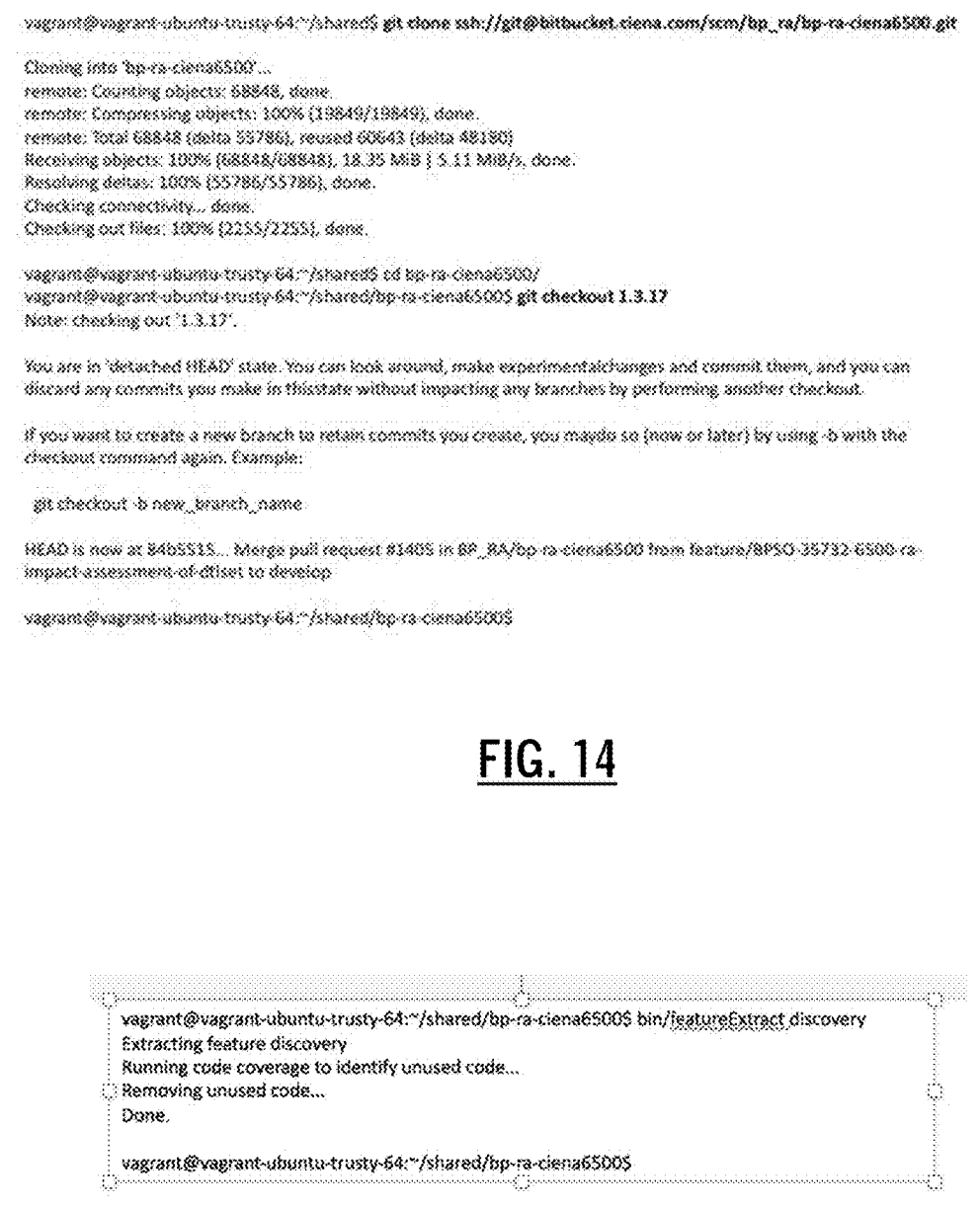
Figure 17:
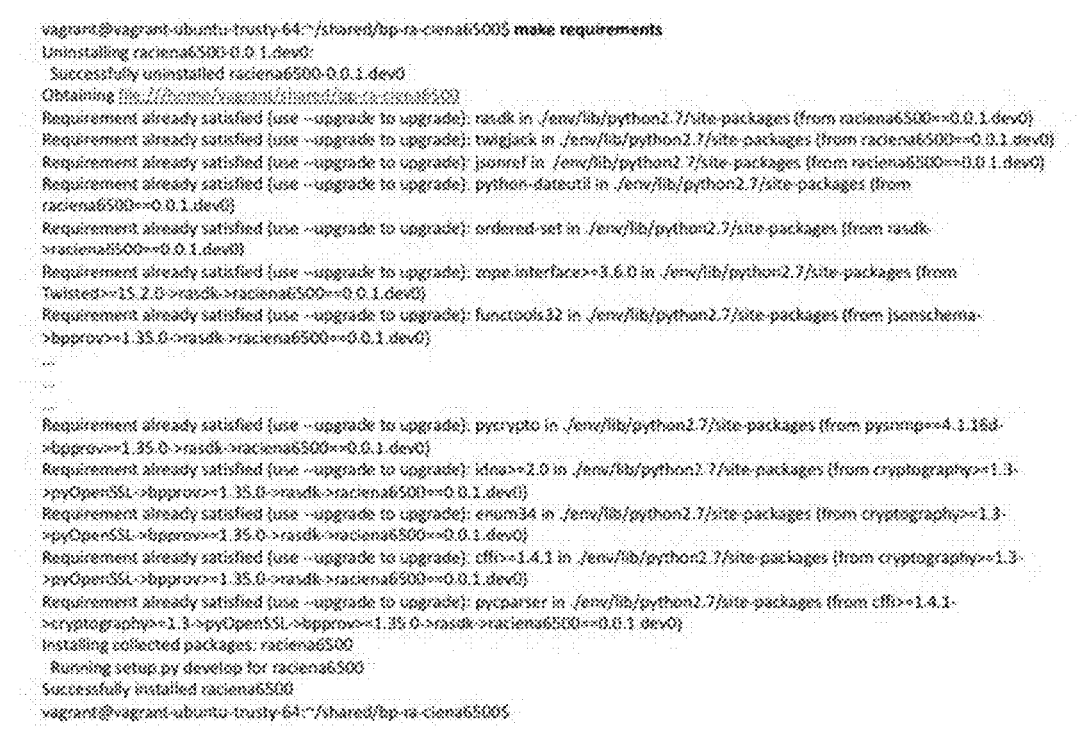

FIGS. 14-18 are screen shots of the generation of the RA with just the discovery functionality;

FIG. 19 is an example JSON format for providing the results to the workloads manager;

FIG. 24 is a block diagram of an exemplary implementation of a server for implementing the workloads manager, the hypervisor, the hardware, and the like.

DETAILED DESCRIPTION OF THE DISCLOSURE

In various exemplary embodiments, the present disclosure relates to systems and methods for distributed and on-demand applications and workflow management in Distributed Network Functions Virtualization (DNFV). The systems and methods include using unikernels for VNF implementation. The systems and methods cover the on demand (just in time) management of applications/workloads at the edge (including the customer premises) of a distributed infrastructure. Specifically, the systems and methods push the application/workload management to the edge of the distributed infrastructure, run the application/workload to participate in the DevOps approach, generate utilization metrics that are tuned to a functionality based shutdown/restart cycle, split the application/workload into specialized applications/workloads based on the self-learned usage metrics at the very edge of the infrastructure, perform just in time launching of application/workload to serve requests, and the like. In an exemplary implementation, a Mirage Domain Name System (DNS) server was shown to outperform both BIND 9 (by about 45%) and a high-performance NSD server. A unikernel image was just 200 Kb while the BIND 9 application was over 400 Mb, a significant improvement.

Software-Defined Wide-Area Networking (SD-WAN) and virtual Customer Premise Equipment (vCPE) have emerged as the pre-eminent use cases for Software-Defined Networking (SDN). Service providers and enterprises are applying software-defined principles to the WAN and the network edge. In addition to SD-WAN and vCPE, the service providers desire to have virtual Contend Distribution Network (vCDN) at the edge to cope with the anticipated increase in Over-the-Top (OTT) style on-demand and live video traffic.

Figure 1:
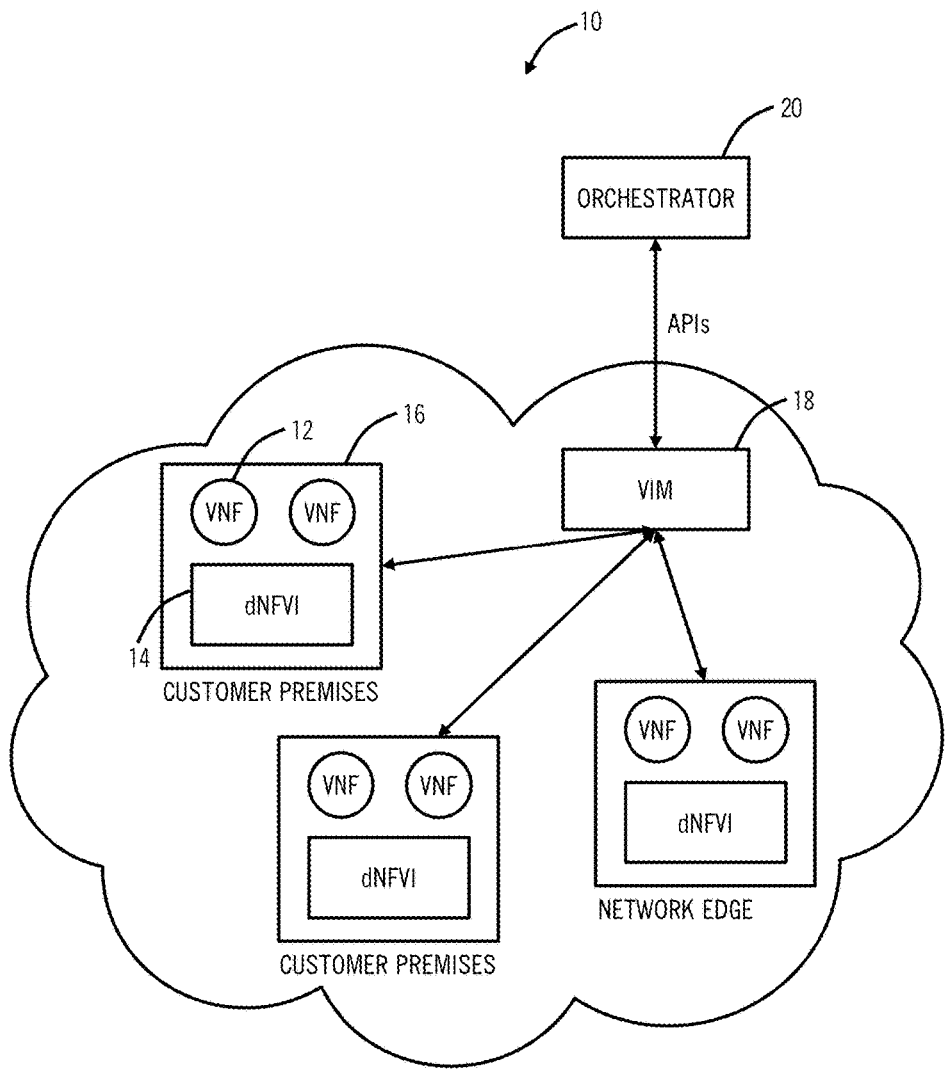
FIG. 1 is a network diagram of a network with distributed Network Functions Virtualization (dNFV)

Referring to FIG. 1, in an exemplary embodiment, a network diagram illustrates a network 10 with distributed Network Functions Virtualization (dNFV). Specifically, there are use cases for the placement of VNFs 12 on compute resources (designated as dNFV Infrastructure (dNFVI) 14) near the edge and/or at a customer premises in a vCPE 16. Again, dNFV is designated as distributed to distinguish it from solutions where all the VNFs are placed in a central data center.

The overall goal is to enable the network operator to offer services to their customers. In the case of dNFV, these services will include VNFs 12 running on the compute resources near the edge and/or at the customer premises 16, but the end-to-end service may include VNFs 12 in the data center as well as various other virtual and physical network functions. However, operators have no way of knowing in advance how workload features are going to be used (or not used) at each of the vCPE 16. Thus, conventionally, these operators use bloated VNFs that are wasting resources at the edge of the distributed infrastructure. The bloated VNFs will run in "virtualization containers" which can either be Virtual Machines (VMs) or Linux Containers. Examples of conventional VNFs are Brocade 5600 vRouter, Silver Peak SD-WAN & WAN Opt, Certes vCEP, Versa FlexVNF, Akamai vCDN, etc.

The network 10 includes Virtual Infrastructure Manager (VIM) 18 for NFV deployments. OpenStack is a common VIM and the only VIM within the Open Platform for NFV (OPNFV) framework, and that would make OpenStack an attractive deployment model. An orchestrator 20 manages the VIM 18, e.g., OpenStack, such as through Application Programming Interfaces (APIs).

Figure 2:
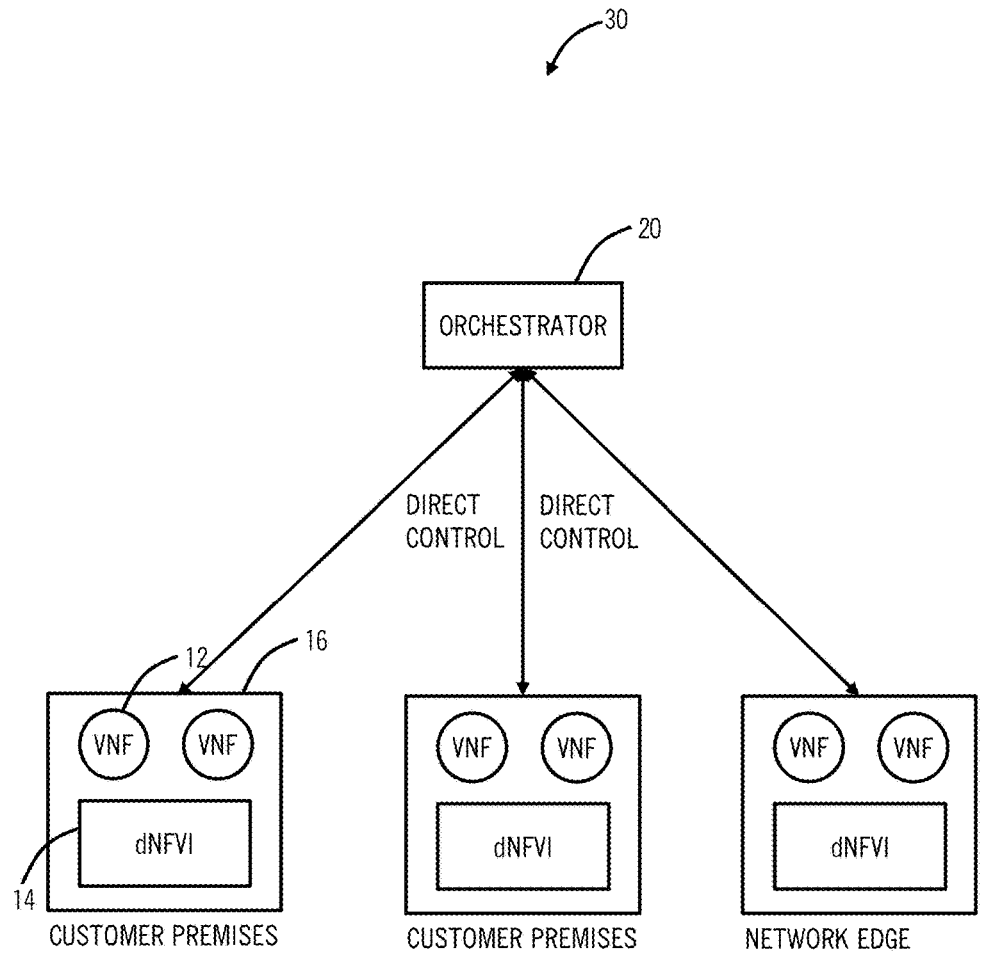
FIG. 2 is a network diagram of a network where the orchestrator directly manages the dNFV Infrastructure (dNFVI)

Referring to FIG. 2, in an exemplary embodiment, a network diagram illustrates a network 30 where the orchestrator 20 directly manages the dNFVI. The network 30 excludes the VIM 18, and the orchestrator 20 has direct control of the VNFs 12, the dNFVI 14, and the vCPE 16.

In both the networks 10, 30, utilizing a VM and/or Docker software container, means that a standard operating system kernel is booted to run the application/workload. A highly layered software stack supports each application/workload. As a result, there is no optimization and the time for the application/workload to be ready to serve its purpose is relatively long. Another important trend is the VM density per host. Work is proceeding to support thousands (e.g., 2000-3000) of VMs per host. Recent performance is around 600+ VMs. Centralized management of this magnitude of VMs per host is not viable in the networks 10, 30. Service providers are adopting an agile, DevOps-style approach to developing and implementing automation in its network. There is a need for the workload itself to participate in this agile DevOps approach.

To address the aforementioned limitations, the systems and methods use unikernels for realizing the VNFs 12. The unikernels provide improved security, small footprint, whole system optimization, and low boot time. Specifically, the systems and methods include, the applications/workloads self-learn the functionalities that are utilized/not utilized and request new unikernel compilations and just in time deployments. As described herein, a unikernel is a workload or application.

In an exemplary embodiment, the systems and methods allow the applications/workloads to become self-aware of their usage and dynamically specialized into a single purpose application/workload to be re-deployed in distributed cloud platforms. These specialized single purpose application/workloads run directly on the hypervisor or hardware as a unikernel without the operating system such as Linux/Window.

Figure 3:
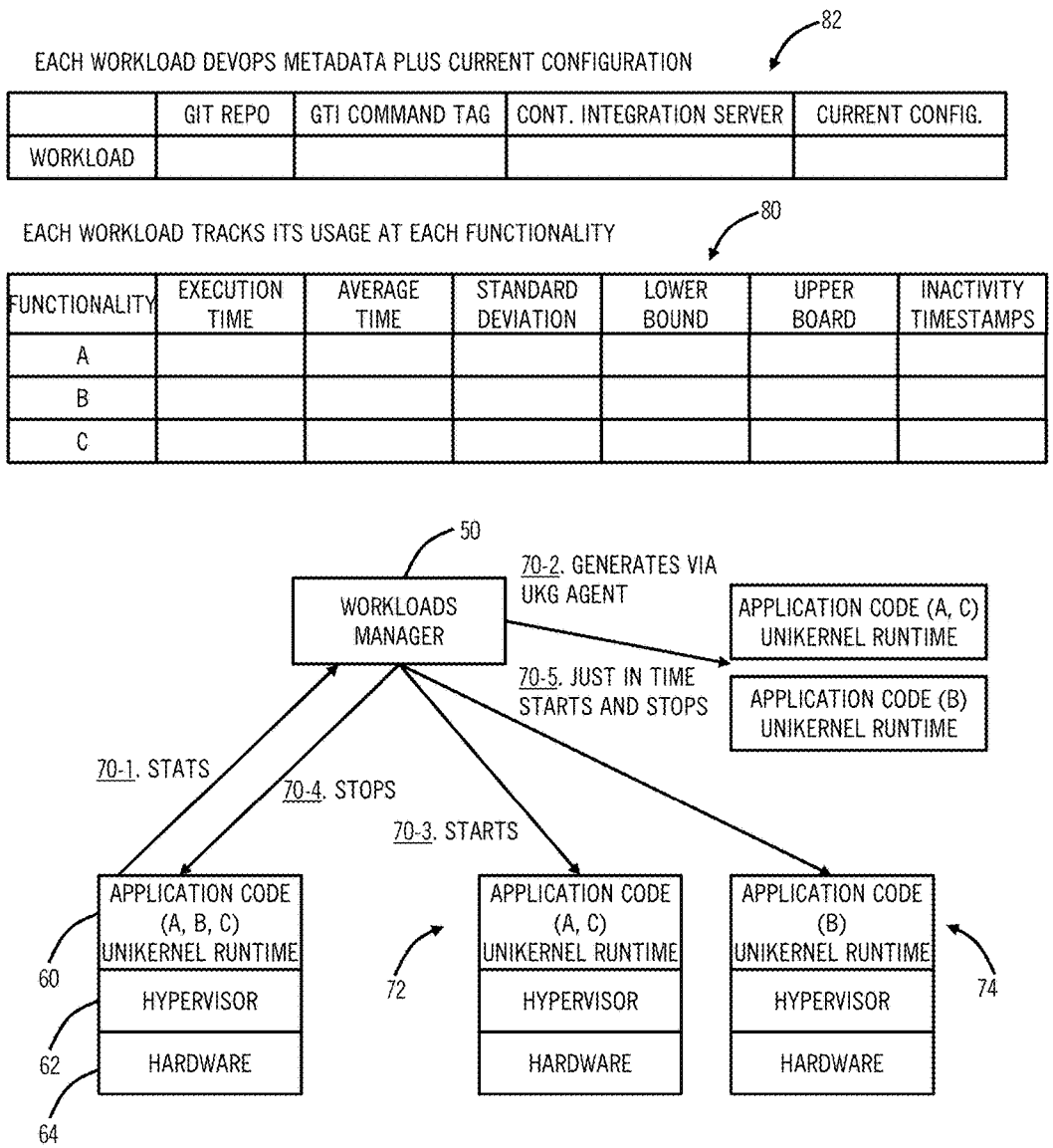
FIG. 3 is a diagram of a workloads manager responsible for starting/stopping unikernels, tracking dependencies between the unikernels and routing internal/external service requests to the correct unikernels, in the networks.

Referring to FIG. 3, in an exemplary embodiment, a diagram illustrates a workloads manager 50 responsible for starting/stopping unikernels, tracking dependencies between the unikernels and routing internal/external service requests to the correct unikernels, in the networks 10, 30. Specifically, the VNFs 12 in the networks 10, 30 can be implemented as workloads 60 (implemented through application code A, B, C) which operate on a hypervisor 62 on hardware 64. In this manner, the actual code implementing the VNFs 12 is much less than conventional VM or software containers. FIG. 3 illustrates a case of the exemplary workloads 60 with three (3) functionalities (denoted as A, B, and C).

An exemplary operation is now described with the workloads manager 50. The workload 60 regularly informs the workloads manager 50 of its usage statistics (step 70-1). The workloads manager 50 determines that based on the usage statistics, the functionality B is sparsely (/rarely/infrequently) utilized. The workload 60 can be split into two different unikernels 72, 74. The first unikernel 72 is specialized with functionality A and C. The second unikernel 74 is specialized with the functionality B. The workloads manager 50 uses the workload DevOps metadata plus current configuration information to contact a unikernel generation agent (step 70-2) to build such unikernels, and download them to the host (the hypervisor 62 and the hardware 64).

The workloads manager 50 starts (step 70-3) the newly downloaded unikernel (with functionalities A and C) and starts redirecting service requests to this unikernel. The original workload 60 is then shut down (step 70-4). When an infrequent request for the functionality B is received at the workloads manager 50, the unikernel (with functionality B) is started to handle this request. After the request is handled, the workloads manager 50 shuts down the unikernel B (step 70-5). Thus, in operation, the unikernels for the workload 60 operate directly on the hypervisor 62 and the hardware 64. This is possible because of the low boot time nature of the unikernel.

The workloads manager 50 tracks various usage statistics (step 70-1). For example, the usage statistics are shown in a table 80 and can include, for each functionality A, B, C, execution time, average time, standard deviation, lower bound, upper bound, inactivity timestamps, etc. Also, the workloads manager 50 can use workload DevOps metadata plus current configuration information to contact the unikernel generation agent. The workload DevOps metadata plus current configuration information is shown, for example, in a table 82, and can include Git repository, GTI commit tag, continuous integration server, and current configuration.

Figure 4:
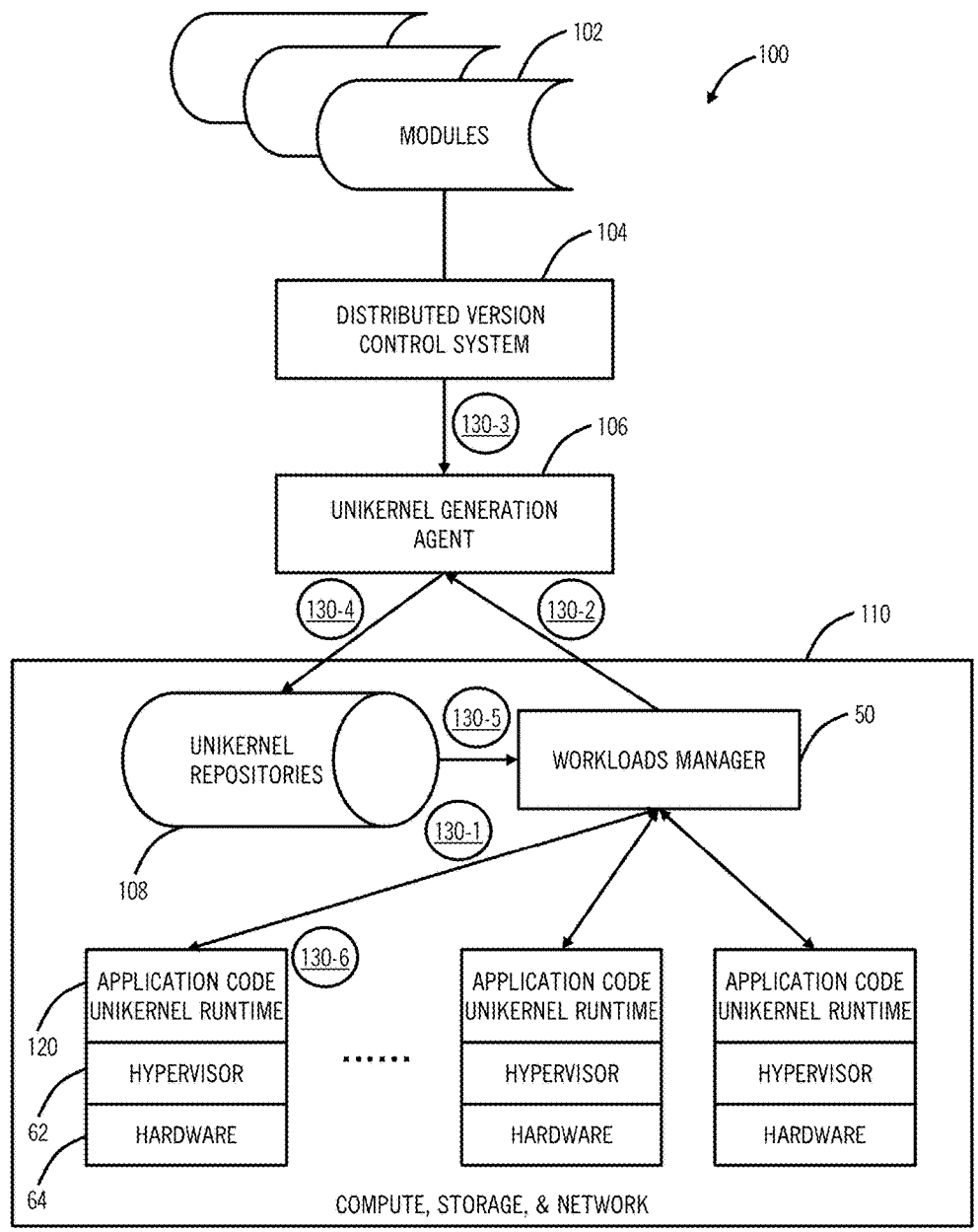
FIG. 4 is a diagram of a unikernel generation and management system with the workloads manager of FIG. 3.

Referring to FIG. 4, in an exemplary embodiment, a diagram illustrates a unikernel generation and management system 100 with the workloads manager 50. The system 100 includes modules 102, a distributed version control system 104 with high-level modular source code for the workload 60, a unikernel generation agent 106, unikernel repositories 108 at an edge of a distributed infrastructure 110, the workloads manager 50 at the edge of the distributed infrastructure 110 managing unikernels 120, and the unikernels 120 in the distributed infrastructure 110 which can include a compute, storage, and/or network infrastructure executed on the hypervisor 62 and the hardware 64.

An example flow in the unikernel generation and management system 100 is described as follows. The unikernel 120 informs the workloads manager 50 with its DevOps metadata, its configurations, and self-instrumented usage metrics (step 130-1). The workloads manager 50 requests the unikernel generation agent 106 to specialize/re-generate this unikernel 120 into one or more unikernel images based on the functionality usage statistics (step 130-2). The unikernel generation agent 106 pulls the relevant modules 102 from the distributed version control system 104 and performs multiple compilations to generate the desired specialized images (step 130-3).

The resulting unikernel images are downloaded into the unikernel repositories 108 (step 130-4). The workloads manager 50 terminates the running unikernel, saving resource utilization (step 130-5). When a request for the unikernel is received, the workloads manager 50 pulls the corresponding image and can spin up the unikernel (because of low boot time) just in time to service the request (step 130-6).

Figure 5:
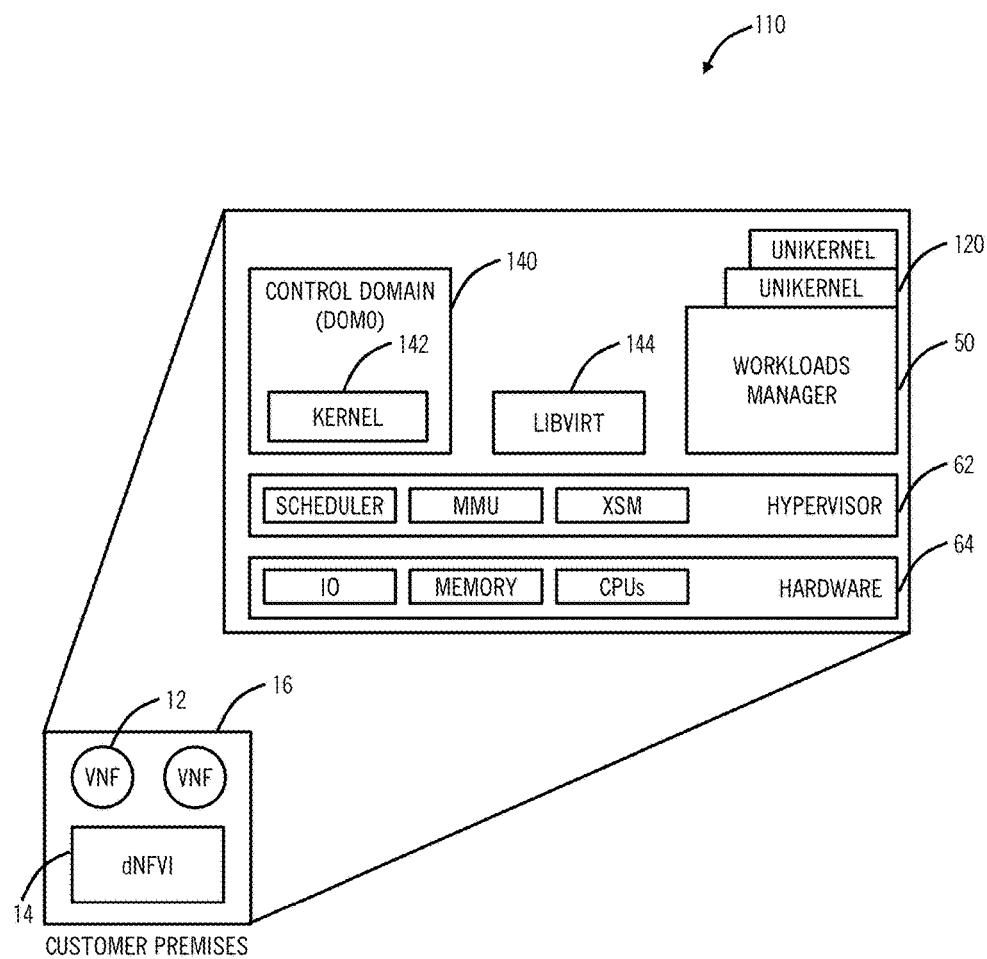
FIG. 5 is a diagram of an exemplary implementation of the distributed infrastructure.

Referring to FIG. 5, in an exemplary embodiment, a diagram illustrates an exemplary implementation of the distributed infrastructure 110, i.e., dNFVI. The distributed infrastructure 110 includes the customer premises 16 with one or more VNFs 12. The customer premises 16 includes the hypervisor 62, the hardware 64, the workloads manager 50, the unikernel 120, a control domain 140 with a kernel 142, and an Application Programming Interface (API) 144 (e.g., libvirt) for managing the virtualization. The workloads manager 50 can run on the first unikernel 120 and other workloads/unikernels 120 are managed using the API 144 (e.g., libvirt). The hardware 64 can include Input/Output (IO), memory, processors (CPUs), and the like. The hypervisor 62 can include a scheduler, a Memory Management Unit (MMU), a security module (XSM), and the like. In an exemplary embodiment, the hypervisor 62 can be a Xen hypervisor and the VNFs 12 can include a Carrier Ethernet switch implemented via the unikernels 120.

Figure 6:
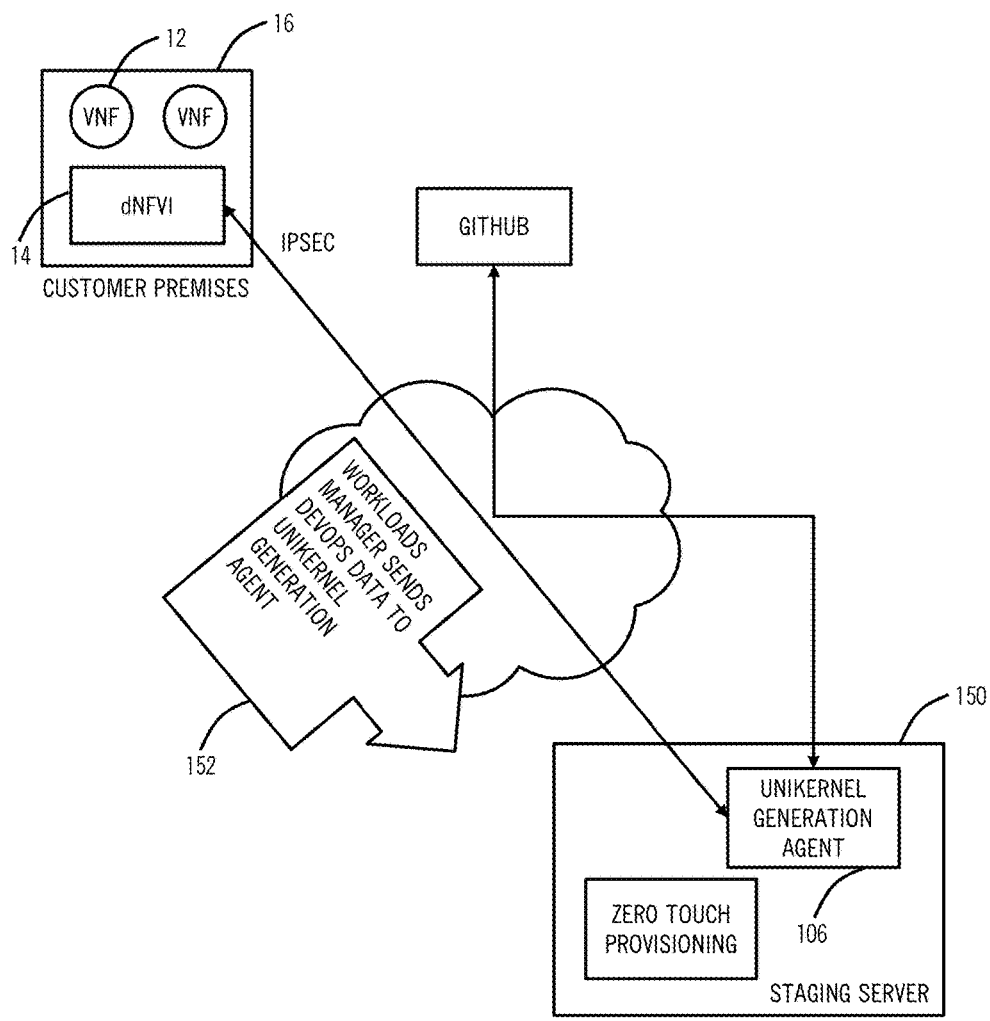
FIG. 6 is a diagram of the workloads manager interaction with the unikernel generation agent.

Referring to FIG. 6, in an exemplary embodiment, a diagram illustrates the workloads manager 50 interaction with the unikernel generation agent 106. Zero touch provisioning is normally used in the dNFVI deployment. When the vCPE (the customer premises 16) is powered on, it contacts a service provider's staging server 150 and downloads a pre and post configuration to set up secure networking (e.g., Internet Protocol Security (IPSEC)). The workloads manager 50 piggybacks on this ability to interact with the unikernel generation agent 106. In the example with the functionality A, B, C, the workloads manager 50 determines that the unikernel with functionality A, B, C can be split into two unikernels based on the usage statistics. The Workloads Manager sends metadata 152 to the unikernel generation agent 106. FIG. 7 illustrates exemplary metadata for unikernel generation, namely the metadata 152.

Figure 8:
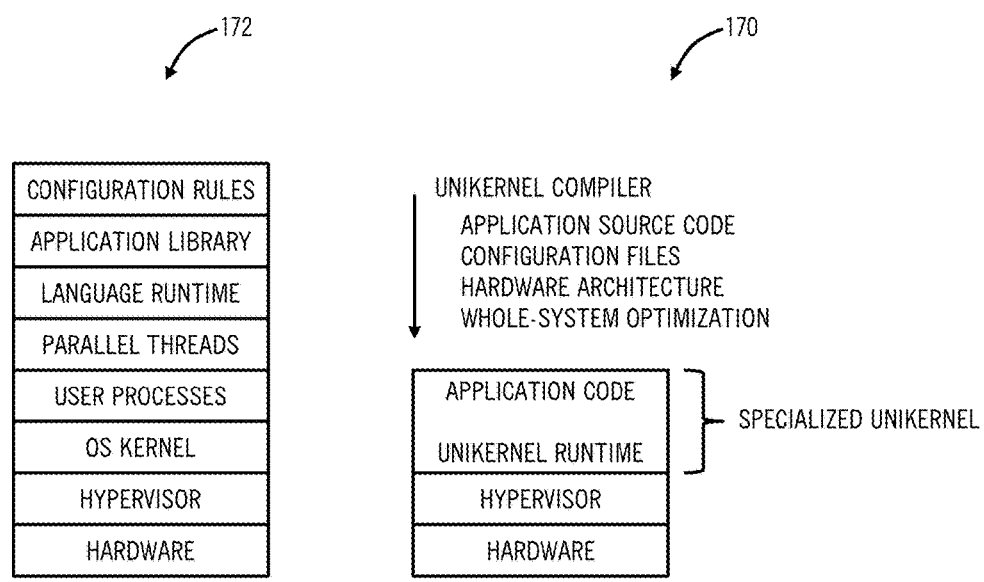
FIG. 8 is a diagram of unikernel compilation steps compared to a conventional approach with an Operating System (OS) kernel.

The unikernel generation agent 106 can perform the following steps using the information from the metadata 152.
  git clone git://github.com/blueplanet/sd-wan.git
    git checkout 02312b5c72261f61a93b4dba4a9acdc09814fbd7
    bin/featureExtract "A,C"--config'{"ip":"10.92.19.72", "port":8080}'
  mirage configure-t xen && make FIG. 8 illustrates unikernel compilation steps 170 compared to a conventional approach 172 with an OS kernel. The conventional approach 172 includes configuration rules, an application library, language runtime, parallel threads, and user processes on the OS kernel which operates on the hypervisor 62 and the hardware 64. By contrast, the unikernel compilation steps 170 include compiling application source code, configuration files, hardware architecture, and whole-system optimization in a specialized unikernel which operates directly on the hypervisor 62 and the hardware 64. In the example herein, the unikernel is compiled with the features A, C, e.g., generating a sd-wan-A-C.xen and a Xen configuration file. Similarly, a second unikernel is generated with just feature B, sd-wan-B.xen and its Xen configuration file. These files are downloaded securely back to the workloads manager 50 and stored in the unikernel repositories 108 (step 130-4). Finally, the workloads manager uses the API 144 (libvirt) to spin up/down these unikernels just-in-time.

The following describes a specific example using an exemplary VNF, namely a Resource Adapter (RA) and how a workload can participate in the DevOps approach. This specific example is implemented using Python, but other programming languages are contemplated such as, without limitation, Go, Ocaml, Haskell, C/C++, Erlang, JavaScript (Node.js). The RA can be a VNF to manage a network element using Transaction Language 1 (TL1) over a secure shell to communicate with the network element. The RA has the functionalities to discover, provision, and performance management. As an example, the RA can manage Ciena's 6500 network element which is a Packet-Optical Transport System (POTS).

Figure 9:
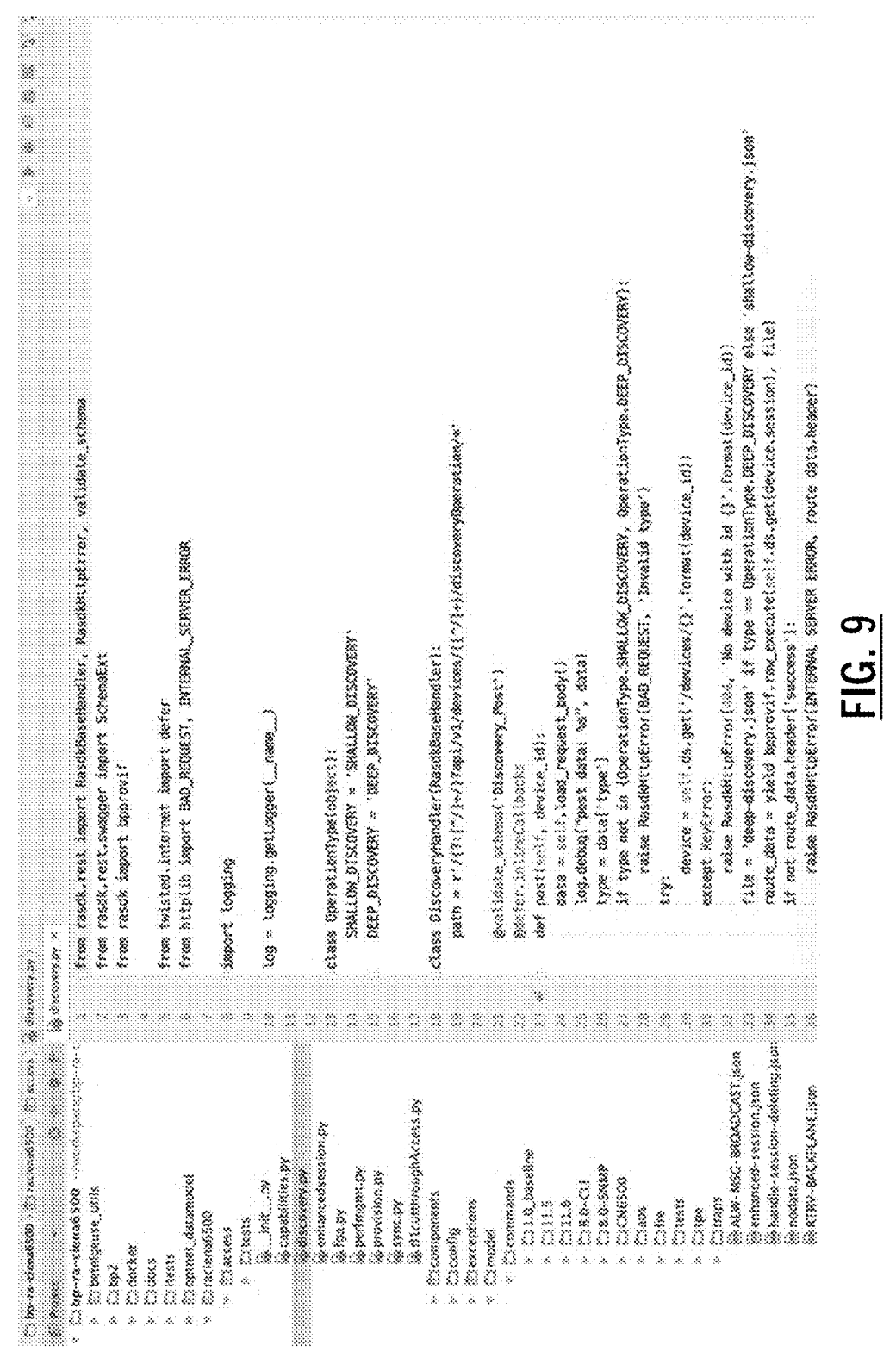

FIG. 9 illustrates code for the RA implemented with a modular structure. FIG. 9 shows the discovery.py code that is responsible for performing shallow discovery and deep discovery of the network element. There are other Python files, like provision.py and perfmgmt.py. There are no dependencies between these functionalities. Therefore, the RA can be split into different specialized RAs (unikernels) depending on the usage.

Figure 10:
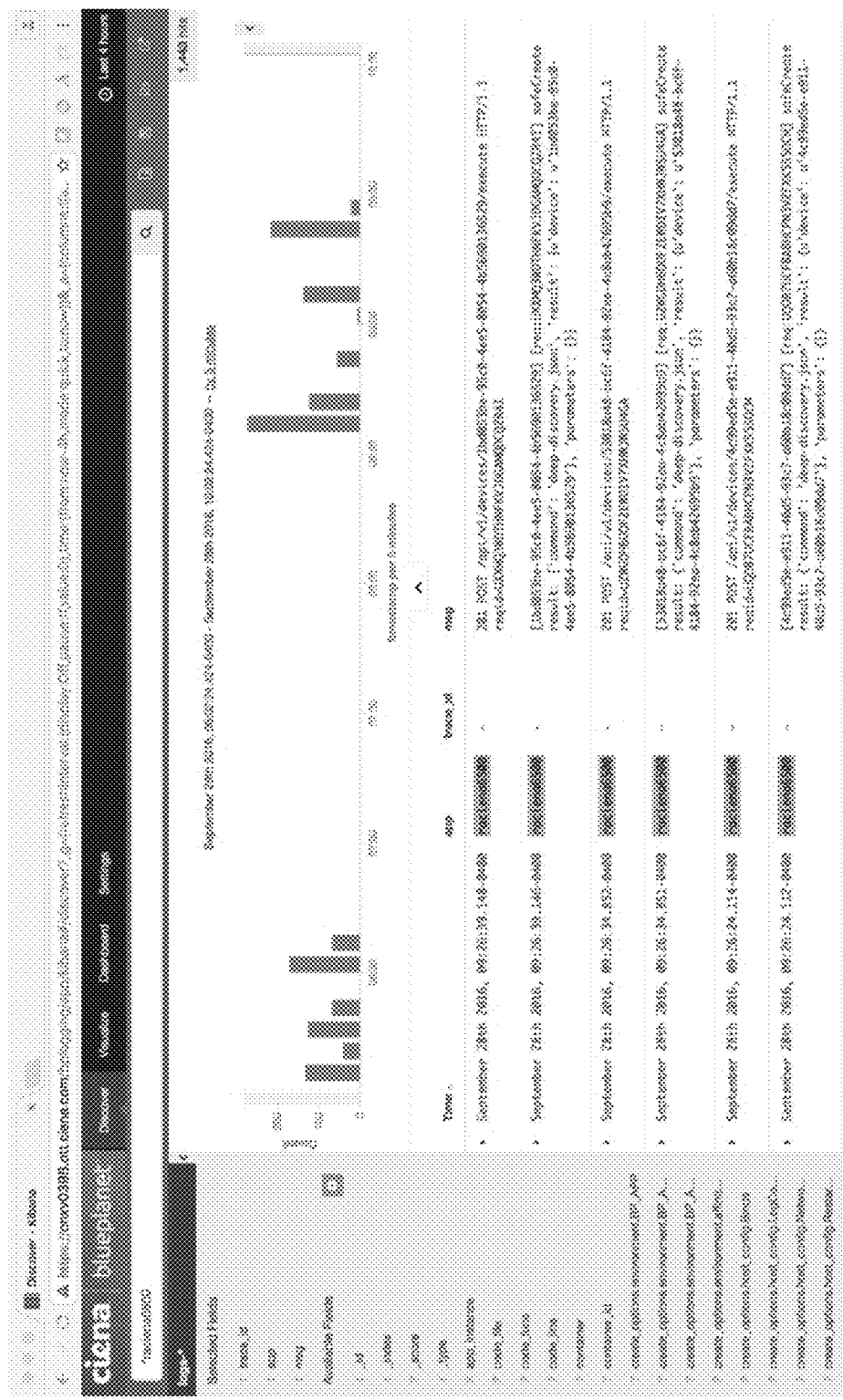
FIG. 10 is a screen shot of typical usage of the RA over a four-hour period.

FIG. 10 illustrates a screen shot of typical usage of the RA over a four-hour period. As can be seen in FIG. 10, there is a significant time gap in usage as well as the functionalities. The log messages are showing the usage. That is, the RA monitors itself on how it is being used. The deep discovery function is being used near the end of this four-hour period. Although not shown, the shallow discovery function is being used near the beginning of the period. This is expected as normally a shallow discovery is performed first. During this period, there is no provisioning utilized. In this type of deployment scenario, it makes sense to split this RA into at least 2 different specialized RAs. These RAs will be smaller in footprint.

FIG. 11 illustrates metadata for the RA in JavaScript Object Notation (JSON). The DevOps and feature extraction aspects as described. The workloads manager 50 uses the metadata in FIG. 11 and usage data to generate a request to the unikernel generation agent 106. FIG. 12 illustrates a POST request from the workloads manager 50 to the unikernel generation agent 106, i.e., a REST API call such as POST https://10.92.19.208/ukagent/api/v1/generate. The communication is over the secure communication channel. FIG. 13 illustrates a specific example in JSON for a request to generate two unikernels.

The unikernel generation agent 106 receives the request in FIG. 13. The unikernel generation agent 106 performs the following steps, using the data in the request. Note, Docker is used as an example image format. Other image formats are qcow2, ova, xen, etc. The following generates a discovery only unikernel:

```
git clone ssh://git@bitbucket.ciena.com/bp_ra/bp-ra-ciena6500.git
cd bp-ra-ciena6500
git checkout 1.3.17
bin/featureExtract discovery
make clean
make prepare-venv
make requirements
make TAG=1.3.17_discovery FORMAT=docker image
```

The following generates a provision_perfmgmt only unikernel:

```
git clone ssh://git@bitbucket.ciena.com/bp_ra/bp-ra-ciena6500.git
cd bp-ra-ciena6500
git checkout 1.3.17
bin/featureExtract provision perfmgmt
make clean
make prepare-venv
make requirements
make TAG=1.3.17_provision_perfmgmt FORMAT=docker image
```

FIGS. 14-18 are screen shots illustrating the generation of the RA with just the discovery functionality. The generation of the RA with provision and performance management functions outputs similar messages. Once the images are generated, the workloads manager 50 downloads and store them in the local storage space.

The following describes how a workload monitors its usage. The RA has built-in instrumentation to record the execution time for each of its functionality. At regular intervals (in this example, every 15 minutes), the RA sends the timing results to the workloads manager 50. FIG. 19 illustrates an example JSON format for providing the results. This metrics data is used by the workloads manager 50 to decide on how to specialize the RA.

Figure 20:
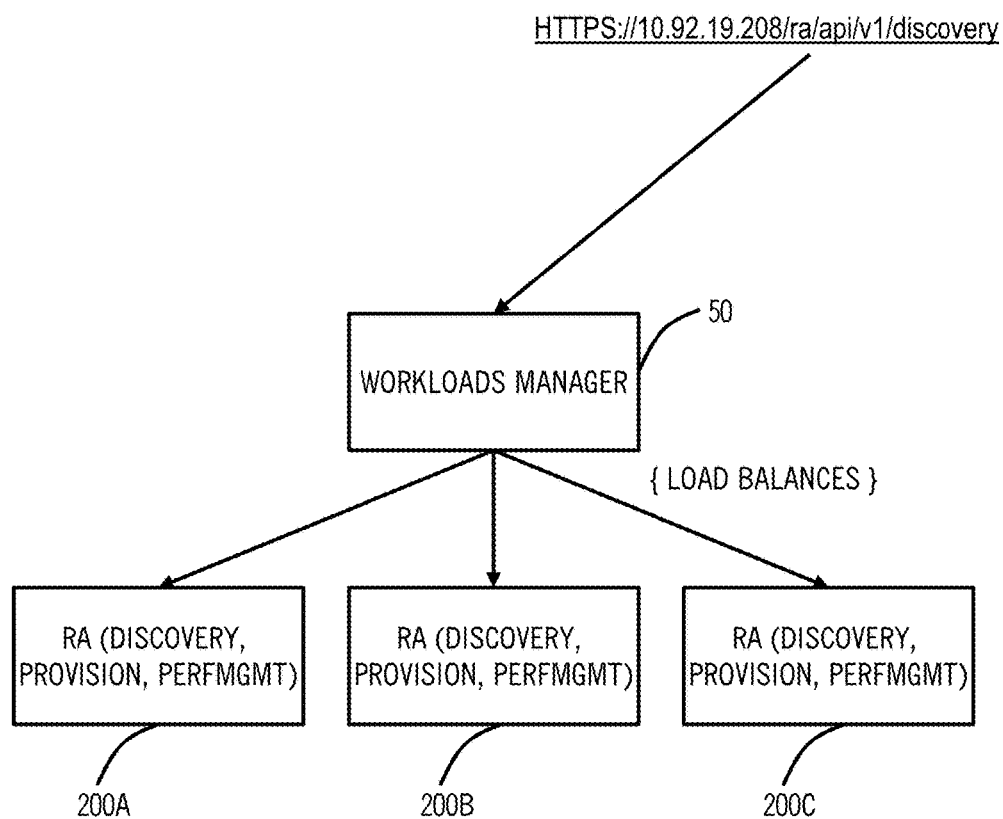
FIG. 20 is a block diagram of the workloads manager load balancing service requests across three RAs.

The following describes on demand (just in time) launching of a workload. The workloads manager 50 has load balancing functionalities like haproxy and Network Address Translation (NAT). In this specific example where the RA has three functionalities, discovery, provision, and perfmgmt (performance management), the workloads manager 50 load balances service requests across three (3) Resource Adapters. FIG. 20 illustrates a block diagram of the workloads manager 50 load balancing service requests across three RAs 200A, 200B, 200C. In FIG. 20, all of the RAs 200A, 200B, 200C have each of the three functionalities.

Figure 21:
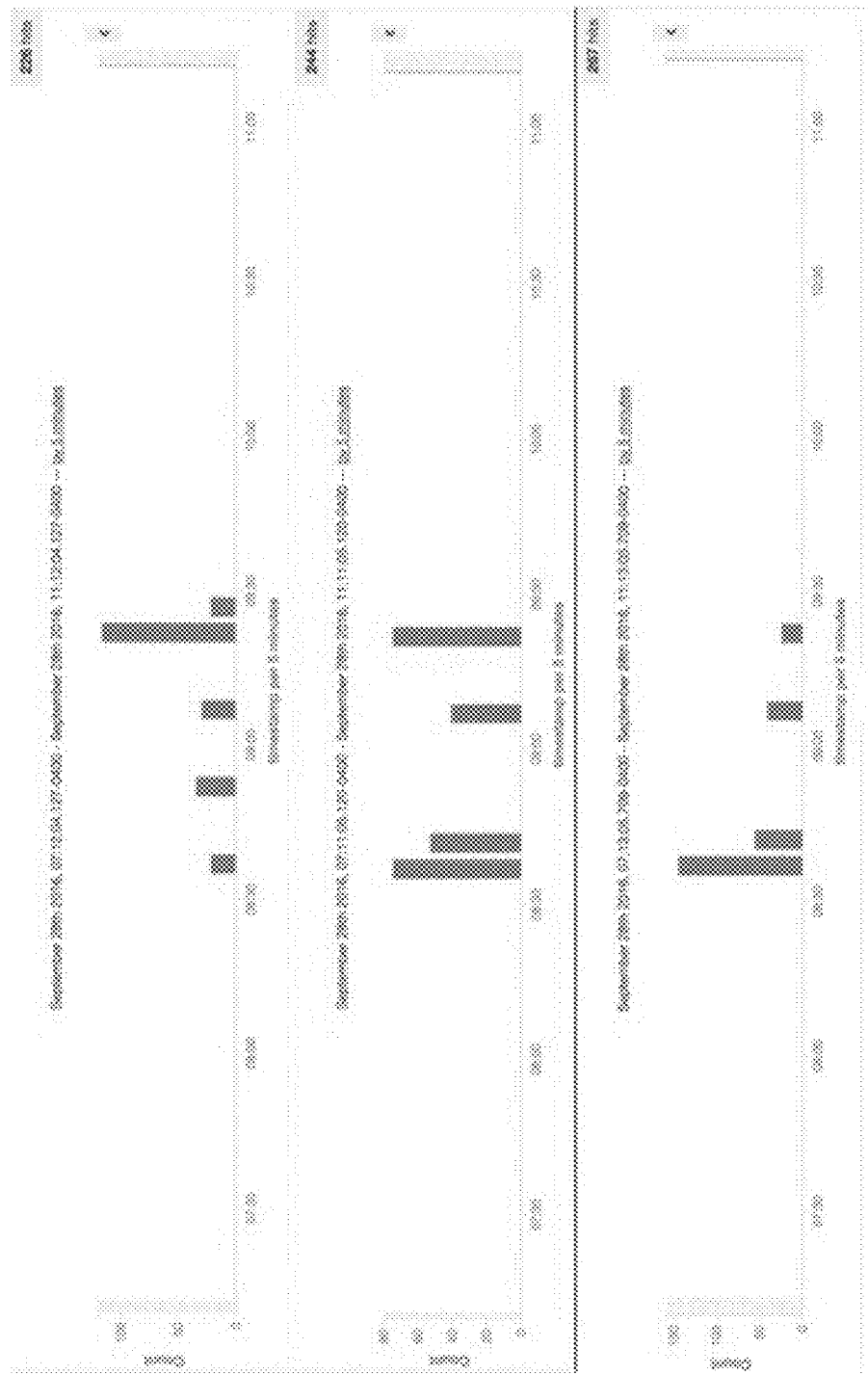
FIG. 21 is graphs of usage statistics of the three RAs from FIG. 20.

FIG. 21 illustrates graphs of usage statistics of the three RAs 200A, 200B, 200C. As can be seen in FIG. 21, there are times when one RA 200 is active and the other two RAs were not. The workloads manager 50 keeps track of the time to boot (launch) each instance of the RA 200 and the functionalities supported by each of the RAs 200.

Figure 22:
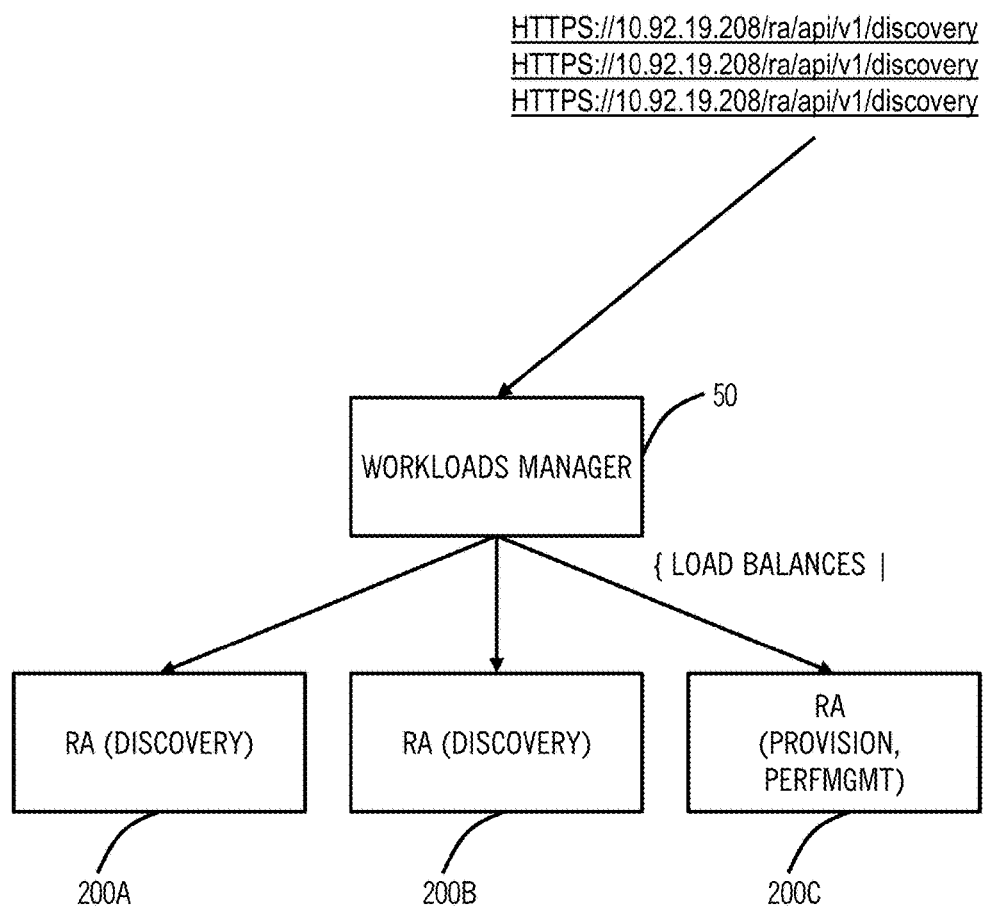
FIG. 22 is a block diagram of the workloads manager load balancing service requests across the three RAs with specialized RA images (unikernels)

Once the newly specialized RA images (that is one RA image with discovery and the other with provision/perfmgmt) are downloaded locally, the workloads manager 50 can optimize the resource utilization on the host. FIG. 22 illustrates a block diagram of the workloads manager 50 load balancing service requests across the three RAs 200A, 200B, 200C with specialized RA images (unikernels). The deployment can be tuned by the workloads manager 50 during the periods when more of the discovery requests are made. This can also be performed similarly for more provision requests.

A novel aspect of the systems and methods is that depending on the feature usage pattern at each deployment, the workloads manager 50 can specialize the RA to meet the demand. For example, if the perfmgmt feature is not used, the workloads manager 50 can decide to specialize the RA into three different images. One with discovery, another with the provision and the third with perfmgmt. That is, the relevant functionalities can be fine-tuned, deployed on demand (just in time) with lightweight unikernels.

Figure 23:
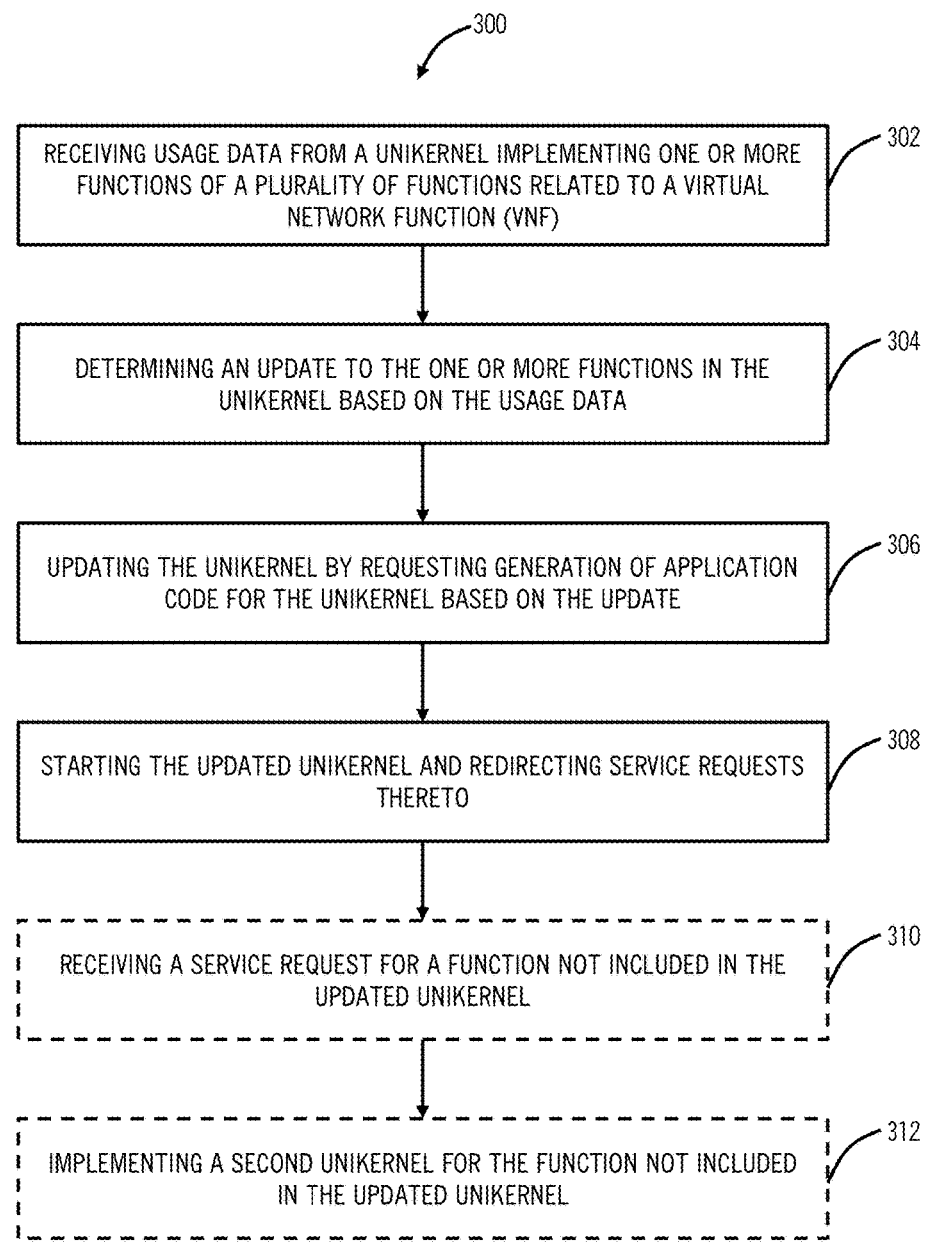
FIG. 23 is a flowchart of a workloads management process for on-demand applications in distributed Network Functions Virtualization Infrastructure (dNFVI)

Referring to FIG. 23, in an exemplary embodiment, a flowchart illustrates a workloads management process 300 for on-demand applications in distributed Network Functions Virtualization Infrastructure (dNFVI). The workloads management process 300 includes receiving usage data from a unikernel implementing one or more functions of a plurality of functions related to a Virtual Network Function (VNF) (step 302); determining an update to the one or more functions in the unikernel based on the usage data (step 304); updating the unikernel by requesting generation of application code for the unikernel based on the update (step 306); and starting the updated unikernel and redirecting service requests thereto (step 308). The workloads management process 300 can further include receiving a service request for a function not included in the updated unikernel (step 310); and implementing a second unikernel for the function not included in the updated unikernel (step 312). The workloads management process 300 can further include stopping the unikernel subsequent to the starting of the updated unikernel. The unikernel and the updated unikernel are executed directly on a hypervisor.

The usage data can include DevOps metadata, configurations, and usage metrics, and wherein the update is determined based on the usage metrics of the one or more functions. The requesting generation of the application code can be to a unikernel generation agent which pulls the application code for one or more of the plurality of functions based on the update and performs compilations to generate the updated unikernel. The workloads management process 300 can be performed by a workloads manager implemented on the unikernel, and wherein other unikernels are managed using an Application Programming Interface (API) to the workloads manager.

Figure 24:
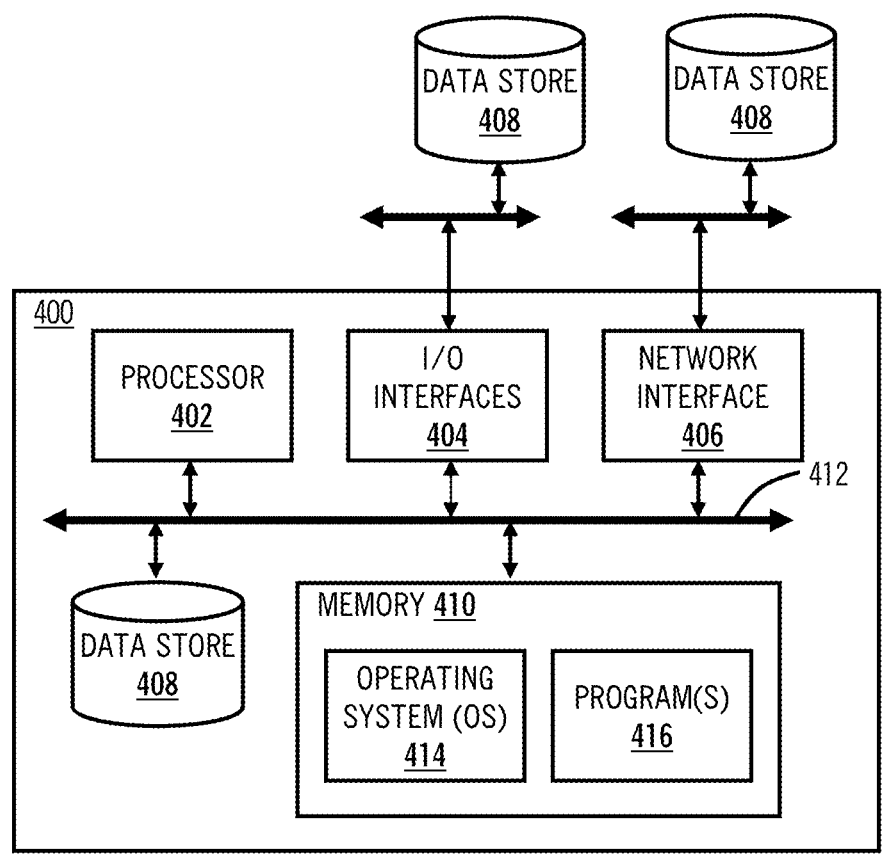

Referring to FIG. 24, in an exemplary embodiment, a block diagram illustrates an exemplary implementation of a server 400 for implementing the workloads manager 50, the hypervisor 62, the hardware 64, and the like. The server 400 can be a digital computer that, in terms of hardware architecture, generally includes a processor 402, input/output (I/O) interfaces 404, a network interface 406, a data store 408, and memory 410. It should be appreciated by those of ordinary skill in the art that FIG. 24 depicts the server 400 in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example, but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 can include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the server 400, a semiconductor-based microprocessor (in the form of a microchip or chip set), or generally any device for executing software instructions. When the server 400 is in operation, the processor 402 is configured to execute software stored within the memory 410, to communicate data to and from the memory 410, and to generally control operations of the server 400 pursuant to the software instructions. The I/O interfaces 404 can be used to receive user input from and/or for providing system output to one or more devices or components. User input can be provided via, for example, a keyboard, touchpad, and/or a mouse. System output can be provided via a display device and a printer (not shown). I/O interfaces 404 can include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 406 can be used to enable the server 400 to communicate on a network. The network interface 406 can include, for example, an Ethernet card or adapter (e.g., 10BaseT, Fast Ethernet, Gigabit Ethernet, 10GbE) or a wireless local area network (WLAN) card or adapter (e.g., 802.11a/b/g/n/ac). The network interface 406 can include address, control, and/or data connections to enable appropriate communications on the network. A data store 408 can be used to store data. The data store 408 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 can incorporate electronic, magnetic, optical, and/or other types of storage media. In one example, the data store 408 can be located internal to the server 400 such as, for example, an internal hard drive connected to the local interface 412 in the server 400. Additionally, in another embodiment, the data store 408 can be located external to the server 400 such as, for example, an external hard drive connected to the I/O interfaces 404 (e.g., SCSI or USB connection). In a further embodiment, the data store 408 can be connected to the server 400 through a network, such as, for example, a network attached file server.

The memory 410 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 410 can incorporate electronic, magnetic, optical, and/or other types of storage media. Note that the memory 410 can have a distributed architecture, where various components are situated remotely from one another, but can be accessed by the processor 402. The software in memory 410 can include one or more software programs, each of which includes an ordered listing of executable instructions for implementing logical functions. The software in the memory 410 includes a suitable operating system (O/S) 414 and one or more programs 416. The operating system 414 essentially controls the execution of other computer programs, such as the one or more programs 416, and provides scheduling, input-output control, file and data management, memory management, and communication control and related services. The one or more programs 416 may be configured to implement the various processes, algorithms, methods, techniques, etc. described herein.

In an exemplary embodiment, a workloads manager for on-demand applications in distributed Network Functions Virtualization Infrastructure (dNFVI) includes one or more processors; and memory storing instructions that, when executed, cause the one or more processors to receive usage data from a unikernel implementing one or more functions of a plurality of functions related to a Virtual Network Function (VNF), determine an update to the one or more functions in the unikernel based on the usage data, update the unikernel by requesting generation of application code for the unikernel based on the update, and start the updated unikernel and redirect service requests thereto. The memory storing instructions that, when executed, can further cause the one or more processors to receive a service request for a function not included in the updated unikernel, and implement a second unikernel for the function not included in the updated unikernel. The memory storing instructions that, when executed, can further cause the one or more processors to stop the unikernel subsequent to the updated unikernel starting. The unikernel and the updated unikernel are executed directly on a hypervisor.

The usage data can include DevOps metadata, configurations, and usage metrics, and wherein the update is determined based on the usage metrics of the one or more functions. The requesting generation of the application code can be to a unikernel generation agent which pulls the application code for one or more of the plurality of functions based on the update and performs compilations to generate the updated unikernel. Other unikernels can be managed using an Application Programming Interface (API) to the workloads manager.

In a further exemplary embodiment, a non-transitory computer-readable medium includes instructions that, when executed, cause one or more processors to perform the steps of: receiving usage data from a unikernel implementing one or more functions of a plurality of functions related to a Virtual Network Function (VNF); determining an update to the one or more functions in the unikernel based on the usage data; updating the unikernel by requesting generation of application code for the unikernel based on the update; and starting the updated unikernel and redirecting service requests thereto.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A workloads management method for on-demand applications in distributed Network Functions Virtualization Infrastructure (dNFVI), the workloads management method comprising:
   receiving usage data from a unikernel implementing one or more functions of a plurality of functions related to a Virtual Network Function (VNF);
   determining an update to the one or more functions in the unikernel based on the usage data;
   updating the unikernel by requesting generation of application code for the unikernel based on the update; and
   starting the updated unikernel and redirecting service requests thereto,
   wherein the unikernel and the updated unikernel are each a specialized, single address space machine image constructed using library operating systems which is executed directly on a hypervisor.

2. The workloads management method of claim 1, further comprising:
   receiving a service request for a function not included in the updated unikernel; and
   implementing a second unikernel for the function not included in the updated unikernel.

3. The workloads management method of claim 1, further comprising:
   stopping the unikernel subsequent to the starting of the updated unikernel.

4. The workloads management method of claim 1, wherein the usage data comprises DevOps metadata, configurations, and usage metrics, and wherein the update is determined based on the usage metrics of the one or more functions.

5. The workloads management method of claim 1, wherein the requesting generation of the application code is to a unikernel generation agent which pulls the application code for one or more of the plurality of functions based on the update and performs compilations to generate the updated unikernel.

6. The workloads management method of claim 1, wherein the workloads management method is performed by a workloads manager implemented on the unikernel, and wherein other unikernels are managed using an Application Programming Interface (API) to the workloads manager.

7. A workloads manager for on-demand applications in distributed Network Functions Virtualization Infrastructure (dNFVI), the workloads manager comprising:
   one or more processors; and
   memory storing instructions that, when executed, cause the one or more processors to
      receive usage data from a unikernel implementing one or more functions of a plurality of functions related to a Virtual Network Function (VNF),
      determine an update to the one or more functions in the unikernel based on the usage data,
      update the unikernel by requesting generation of application code for the unikernel based on the update, and
      start the updated unikernel and redirect service requests thereto,
   wherein the unikernel and the updated unikernel are each a specialized, single address space machine image constructed using library operating systems which is executed directly on a hypervisor.

8. The workloads manager of claim 7, wherein the memory storing instructions that, when executed, further cause the one or more processors to
   receive a service request for a function not included in the updated unikernel, and
   implement a second unikernel for the function not included in the updated unikernel.

9. The workloads manager of claim 7, wherein the memory storing instructions that, when executed, further cause the one or more processors to
   stop the unikernel subsequent to the updated unikernel starting.

10. The workloads manager of claim 7, wherein the usage data comprises DevOps metadata, configurations, and usage metrics, and wherein the update is determined based on the usage metrics of the one or more functions.

11. The workloads manager of claim 7, wherein the requesting generation of the application code is to a unikernel generation agent which pulls the application code for one or more of the plurality of functions based on the update and performs compilations to generate the updated unikernel.

12. The workloads manager of claim 7, wherein other unikernels are managed using an Application Programming Interface (API) to the workloads manager.

13. A non-transitory computer-readable medium comprising instructions that, when executed, cause one or more processors to perform the steps of:
   receiving usage data from a unikernel implementing one or more functions of a plurality of functions related to a Virtual Network Function (VNF);
   determining an update to the one or more functions in the unikernel based on the usage data;
   updating the unikernel by requesting generation of application code for the unikernel based on the update; and
   starting the updated unikernel and redirecting service requests thereto, wherein the unikernel and the updated unikernel are each a specialized, single address space machine image constructed using library operating systems which is executed directly on a hypervisor.

14. The non-transitory computer-readable medium of claim 13, wherein the instructions that, when executed, further cause the one or more processors to perform the steps of:
   receiving a service request for a function not included in the updated unikernel; and
   implementing a second unikernel for the function not included in the updated unikernel.

15. The non-transitory computer-readable medium of claim 13, wherein the instructions that, when executed, further cause the one or more processors to perform the steps of:
   stopping the unikernel subsequent to the starting of the updated unikernel.

16. The non-transitory computer-readable medium of claim 13, wherein the usage data comprises DevOps metadata, configurations, and usage metrics, and wherein the update is determined based on the usage metrics of the one or more functions.

17. The non-transitory computer-readable medium of claim 13, wherein the requesting generation of the application code is to a unikernel generation agent which pulls the application code for one or more of the plurality of functions based on the update and performs compilations to generate the updated unikernel.

\* \* \* \* \*